(12) United States Patent
Rochford et al.

(10) Patent No.: US 10,437,343 B2
(45) Date of Patent: Oct. 8, 2019

(54) AUGMENTED REALITY CONTROL OF INTERNET OF THINGS DEVICES

(71) Applicant: Samsung Electronics Co., Ltd, Suwon-si (KR)

(72) Inventors: Ciaran Rochford, Bellevue, WA (US); Philippe Harscoet, Bellevue, WA (US); Xiaoguang Li, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/400,827

(22) Filed: Jan. 6, 2017

(65) Prior Publication Data

US 2018/0196522 A1    Jul. 12, 2018

(51) Int. Cl.
*G06T 19/00* (2011.01)
*G06F 3/01* (2006.01)
*G06F 1/16* (2006.01)

(52) U.S. Cl.
CPC .............. *G06F 3/017* (2013.01); *G06F 1/163* (2013.01); *G06F 1/1694* (2013.01); *G06F 3/011* (2013.01); *G06F 3/012* (2013.01); *G06F 3/013* (2013.01); *G06T 19/006* (2013.01)

(58) Field of Classification Search
CPC .. G02B 27/01; G02B 27/017; G02B 27/0093; G02B 2027/014; G02B 2027/0138; G02B 2027/0178; G02B 2027/0187; G06T 15/00; G06T 19/006; G06T 2215/16; G06F 1/163; G06F 3/011; G06F 3/012; G06F 3/013; G06F 3/147; G06F 3/017; G06F 3/0304; G06F 3/0383; G06F 3/0425; G06F 3/04812; G06F 3/04815; G06F 3/0484; G06F 3/04847; H04M 1/6058; H04M 1/6066; H04M 1/7253; H04M 2250/22; H04W 8/005
See application file for complete search history.

(56) References Cited

U.S. PATENT DOCUMENTS

| | | |
|---|---|---|
| 8,994,614 B2 | 3/2015 | Bickerstaff et al. |
| 9,123,158 B2 | 9/2015 | Nishimaki et al. |
| 9,142,062 B2 | 9/2015 | Maciocci et al. |

(Continued)

FOREIGN PATENT DOCUMENTS

| | | |
|---|---|---|
| EP | 1906399 A1 | 4/2008 |
| KR | 10-2015-0024291 A | 3/2015 |

(Continued)

OTHER PUBLICATIONS

Communication from a foreign patent office in a counterpart foreign application, ISA/KR, "International Search Report and Written Opinion of the International Searching Authority," International Application No. PCT/KR2018/000292, dated Apr. 13, 2018, 9 pages.

*Primary Examiner* — Michael J Eurice (57) ABSTRACT

A wearable device includes a display, a transceiver, and a processor. The processor is configured to detect, via the transceiver, a device controllable by the wearable device. The processor is also configured to generate a user interface (UI) associated with the device for display on the display based on the detected device. The processor detects an input based on the UI and transmits, via the transceiver, a signal to the device to control the device based on the detected input.

20 Claims, 6 Drawing Sheets

(56) References Cited

U.S. PATENT DOCUMENTS

| | | |
|---|---|---|
| 9,147,290 B2 | 9/2015 | Kim |
| 9,152,226 B2 | 10/2015 | Forutanpour et al. |
| 9,195,029 B2 | 11/2015 | Kim et al. |
| 9,202,306 B2 | 12/2015 | Vesely et al. |
| 9,239,618 B2 | 1/2016 | Cho et al. |
| 9,256,283 B2 | 2/2016 | Kang |
| 9,285,589 B2* | 3/2016 | Osterhout ............ G02B 27/017 |
| 9,826,299 B1* | 11/2017 | Osterhout ............ H04R 1/028 |
| 2004/0209569 A1* | 10/2004 | Heinonen ........... H04M 1/6066 |
| | | 455/41.2 |
| 2008/0180228 A1* | 7/2008 | Wakefield ............ G01S 5/0252 |
| | | 340/4.62 |
| 2011/0151788 A1* | 6/2011 | Castrogiovanni ..... H04W 76/23 |
| | | 455/41.2 |
| 2012/0075343 A1* | 3/2012 | Chen ....................... G09G 5/397 |
| | | 345/633 |
| 2012/0113209 A1* | 5/2012 | Ritchey ................ H04N 5/2254 |
| | | 348/14.02 |
| 2012/0212414 A1* | 8/2012 | Osterhout ............ G02B 27/017 |
| | | 345/158 |
| 2012/0258741 A1* | 10/2012 | Tillson .................... G01S 3/046 |
| | | 455/457 |
| 2013/0069985 A1* | 3/2013 | Wong .................. G02B 27/017 |
| | | 345/633 |
| 2013/0093788 A1* | 4/2013 | Liu ......................... G06F 3/011 |
| | | 345/633 |
| 2013/0096873 A1* | 4/2013 | Rosengaus ........... G01C 15/002 |
| | | 702/151 |
| 2013/0147836 A1* | 6/2013 | Small ..................... G06F 3/011 |
| | | 345/633 |
| 2014/0022591 A1 | 1/2014 | Asahara |
| 2014/0098102 A1* | 4/2014 | Raffle .................. G06F 3/0482 |
| | | 345/440 |
| 2014/0139439 A1* | 5/2014 | Park .................... G06F 3/04886 |
| | | 345/169 |
| 2014/0160248 A1* | 6/2014 | Pomerantz ............. G06F 1/163 |
| | | 348/47 |
| 2014/0160250 A1* | 6/2014 | Pomerantz ......... H04N 5/23229 |
| | | 348/47 |
| 2014/0192085 A1 | 7/2014 | Kim |
| 2014/0361984 A1* | 12/2014 | Kim ....................... G06F 3/013 |
| | | 345/156 |
| 2015/0049012 A1 | 2/2015 | Liu et al. |
| 2015/0054743 A1* | 2/2015 | Orhand .................. G06F 3/167 |
| | | 345/158 |
| 2015/0097719 A1 | 4/2015 | Balachandreswaran et al. |
| 2015/0138645 A1* | 5/2015 | Yoo ..................... G02B 27/0101 |
| | | 359/630 |
| 2015/0145887 A1* | 5/2015 | Forutanpour ........... G06F 3/017 |
| | | 345/633 |
| 2015/0189686 A1* | 7/2015 | Kasher .................. H04W 76/18 |
| | | 455/41.2 |
| 2015/0193983 A1 | 7/2015 | Katz et al. |
| 2015/0234455 A1 | 8/2015 | LaValle et al. |
| 2015/0242015 A1* | 8/2015 | Cho ........................ G06F 3/044 |
| | | 345/174 |
| 2015/0245299 A1* | 8/2015 | Lee ...................... H04W 76/14 |
| | | 370/311 |
| 2015/0271340 A1* | 9/2015 | Yu ........................ H04M 3/543 |
| | | 455/417 |
| 2015/0288427 A1* | 10/2015 | Wang ................ H04W 72/1273 |
| | | 370/329 |
| 2015/0341904 A1* | 11/2015 | Ryu ....................... H04M 1/725 |
| | | 455/458 |
| 2015/0348327 A1 | 12/2015 | Zalewski |
| 2015/0350635 A1 | 12/2015 | Tu et al. |
| 2015/0355467 A1 | 12/2015 | Mukawa et al. |
| 2015/0358614 A1* | 12/2015 | Jin ....................... G02B 27/017 |
| | | 348/49 |
| 2016/0011424 A1 | 1/2016 | Thurber et al. |
| 2016/0012465 A1* | 1/2016 | Sharp .................... G06Q 20/18 |
| | | 705/14.17 |
| 2016/0019727 A1 | 1/2016 | Norton et al. |
| 2016/0026362 A1 | 1/2016 | Chavez et al. |
| 2016/0033770 A1 | 2/2016 | Fujimaki et al. |
| 2016/0035135 A1* | 2/2016 | Park ..................... G06T 19/006 |
| | | 345/633 |
| 2016/0041630 A1 | 2/2016 | Hosenpud |
| 2016/0057553 A1* | 2/2016 | Ryu ..................... H04R 1/1041 |
| | | 340/4.41 |
| 2016/0098082 A1* | 4/2016 | Hong ...................... G06F 3/012 |
| | | 345/173 |
| 2016/0116745 A1* | 4/2016 | Osterhout ............ G06F 3/03547 |
| | | 359/614 |
| 2016/0116979 A1* | 4/2016 | Border .................... G06F 3/013 |
| | | 345/156 |
| 2016/0131912 A1* | 5/2016 | Border ............... G02B 27/0176 |
| | | 345/8 |
| 2016/0133227 A1* | 5/2016 | Yoon ........................ G09G 3/14 |
| | | 345/593 |
| 2016/0154460 A1* | 6/2016 | von Liechtenstein ...................... G02B 27/017 |
| | | 345/156 |
| 2016/0179201 A1* | 6/2016 | Anderson ............... G06F 3/013 |
| | | 345/156 |
| 2016/0255748 A1* | 9/2016 | Kim .................... H05K 7/20972 |
| | | 361/695 |
| 2016/0302027 A1* | 10/2016 | Lee ....................... G10L 15/265 |
| 2016/0335917 A1* | 11/2016 | Lydecker .............. G09B 21/008 |
| 2017/0079001 A1* | 3/2017 | Lewis ..................... H04W 64/00 |
| 2017/0093952 A1* | 3/2017 | Kumar .................... H04L 51/18 |
| 2017/0238126 A1* | 8/2017 | Zhao ....................... H04W 4/80 |
| | | 455/41.2 |
| 2017/0238129 A1* | 8/2017 | Maier ..................... H04W 4/02 |
| | | 455/404.2 |
| 2017/0329141 A1* | 11/2017 | Border ............... G02B 27/0075 |
| 2017/0357333 A1* | 12/2017 | Balan .................... H04N 13/204 |
| 2017/0365231 A1* | 12/2017 | Rider .................. G02B 27/0179 |
| 2017/0371353 A1* | 12/2017 | Millinger, III ......... G05D 1/101 |
| 2018/0035101 A1* | 2/2018 | Osterhout ............ H04N 13/044 |
| 2018/0074329 A1* | 3/2018 | Kazansky ........... G02B 27/0172 |
| 2018/0074599 A1* | 3/2018 | Garcia .................... G06F 3/038 |
| 2018/0131435 A1* | 5/2018 | Atkinson ................ H04B 1/525 |
| 2018/0165171 A1* | 6/2018 | VanBuskirk ......... G06F 11/2257 |
| 2018/0174366 A1* | 6/2018 | Nishibe ............... G06F 3/04842 |
| 2018/0181370 A1* | 6/2018 | Parkinson ............... G06F 3/167 |
| 2018/0241864 A1* | 8/2018 | Males ................... H04W 4/021 |
| 2018/0284969 A1* | 10/2018 | Welker .................. G06F 3/0304 |
| 2019/0007924 A1* | 1/2019 | Chen ........................ G01S 5/02 |

FOREIGN PATENT DOCUMENTS

| | | |
|---|---|---|
| KR | 10-2016-0024733 A | 3/2016 |
| WO | 2016-050572 A1 | 4/2016 |

* cited by examiner

AUGMENTED REALITY CONTROL OF INTERNET OF THINGS DEVICES

TECHNICAL FIELD

This disclosure relates generally to controlling devices using a remote device. More specifically, this disclosure relates to a method and apparatus for presenting an augmented reality display on a remote device to control a device.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications. Controlling IoT devices in an IoT environment may not be user friendly. For example, a user may have difficulty recognizing IoT devices in the IoT environment, difficulty in connecting to the IoT device, and difficulty in controlling the IoT device.

SUMMARY

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services.

In a first embodiment, a display, a transceiver, and a processor. The processor is configured to detect, via the transceiver, a device controllable by the electronic device. The processor is also configured to generate a user interface (UI) associated with the device for display on the display based on information received about the device. The processor detects an input on the UI and transmits, via the transceiver, a signal to the device to control the device based on the detected input.

In a second embodiment, a device includes a memory configured to store an application for controlling the device. The device also includes a transceiver configured to receive a first signal from an electronic device after detection of a beacon of the device, transmit information about the application to the electronic device in response to receipt of the first signal, and receive a second signal from the electronic device. The device also includes a processor configured to control at least one function of the device based on the second signal.

In a third embodiment, a method for operating an electronic device to control a device includes detecting the device controllable by the electronic device. The method also includes generating a user interface (UI) associated with the device for display on the electronic device based on information received about the device, detecting an input on the UI, and transmitting a signal to the device to control the device based on the detected input.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 5, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Figure 1:
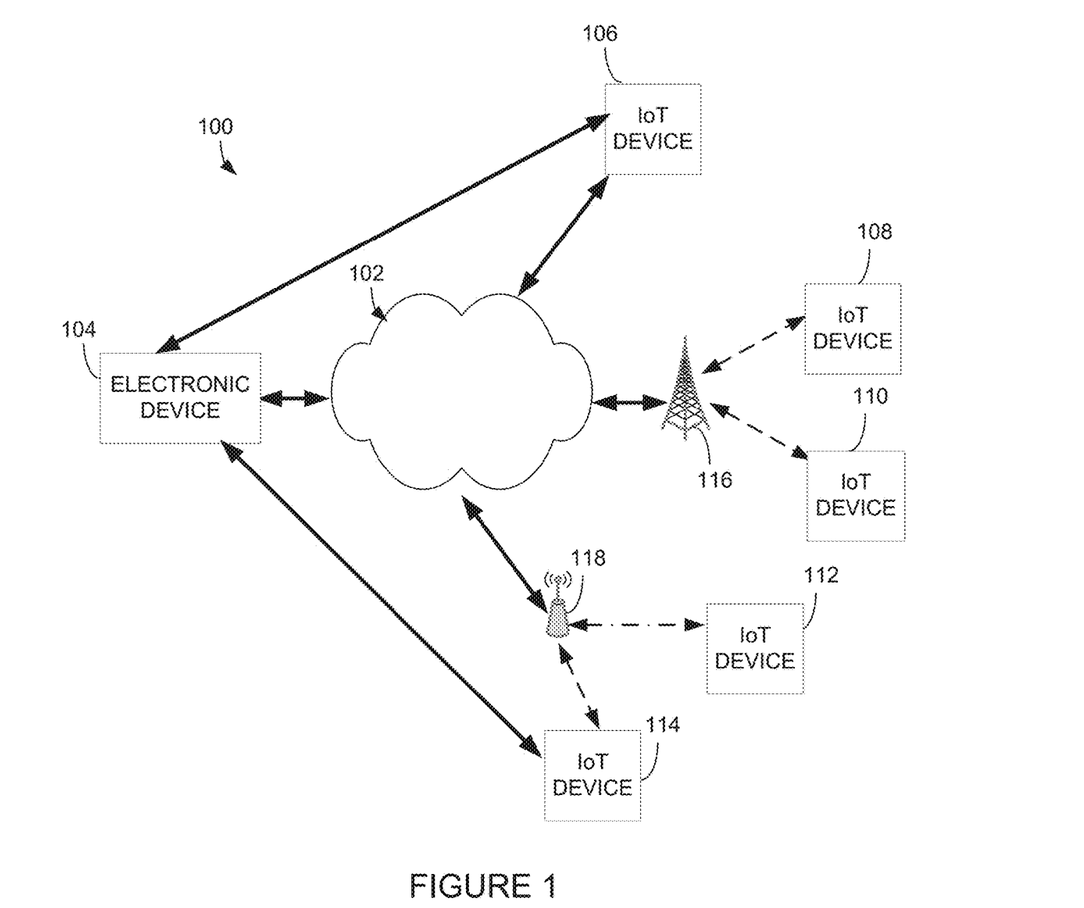
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between the electronic device 104 and various Internet of Things (IoT) devices 106-114. The electronic device 104 may be, for example, a smartphone, a wearable device, head-mounted display (HMD), or television. Each electronic device 104 includes any suitable computing or processing device that can provide computing services for one or more client devices. Each electronic device 104 could, for example, include one or more processing devices, one or more memories storing instructions and data, and one or more network interfaces facilitating communication over the network 102.

Each IoT device 106-114 represents any suitable computing or processing device that interacts with at least one electronic device or other computing device(s) over the network 102. In this example, the IoT devices 106-114 may include an electronic device, which, according to various embodiments of the present disclosure, may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, or a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the IoT devices 106-114 may be a home appliance. The home appliance may include at least one of, for example, a television, a Digital Video Disk (DVD) player, an audio, a refrigerator, an air conditioner, a vacuum cleaner, an oven, a microwave oven, a washing machine, a dryer, an air cleaner, a set-top box, a home automation control panel, a security control panel, a TV box (e.g., SAMSUNG HOMESYNC™, APPLE TV®, or GOOGLE TV®), a game console (e.g., XBOX® and PLAYSTATION®), an electronic dictionary, an electronic key, a camcorder, an electronic photo frame, etc.

According to another embodiment, the IoT devices 106-114 may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet of things device (e.g., a light bulb, electric or gas meter, a sprinkler device, a fire alarm, a thermostat, a streetlamp, a toaster, fitness equipment, a hot water tank, a heater, a boiler, etc.).

According to some embodiments, the IoT devices 106-114 may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

In this example, some IoT devices 108-114 communicate indirectly with the network 102. For example, the IoT devices 108-110 communicate via one or more base stations 116, such as cellular base stations or eNodeBs. Also, the IoT devices 112-114 communicate via one or more wireless access points 118, such as IEEE 802.11 wireless access points. In addition, the IoT devices 108-114 can communicate directly with the electronic device 104 using WIFI®, BLUETOOTH®, or any short range communication protocols. Note that these are for illustration only and that each client device could communicate directly with the network 102 or indirectly with the network 102 via any suitable intermediate device(s) or network(s).

As described in more detail below, the electronic device 104 presents an augmented display to a user in order to control one or more of the IoT devices 106-114

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
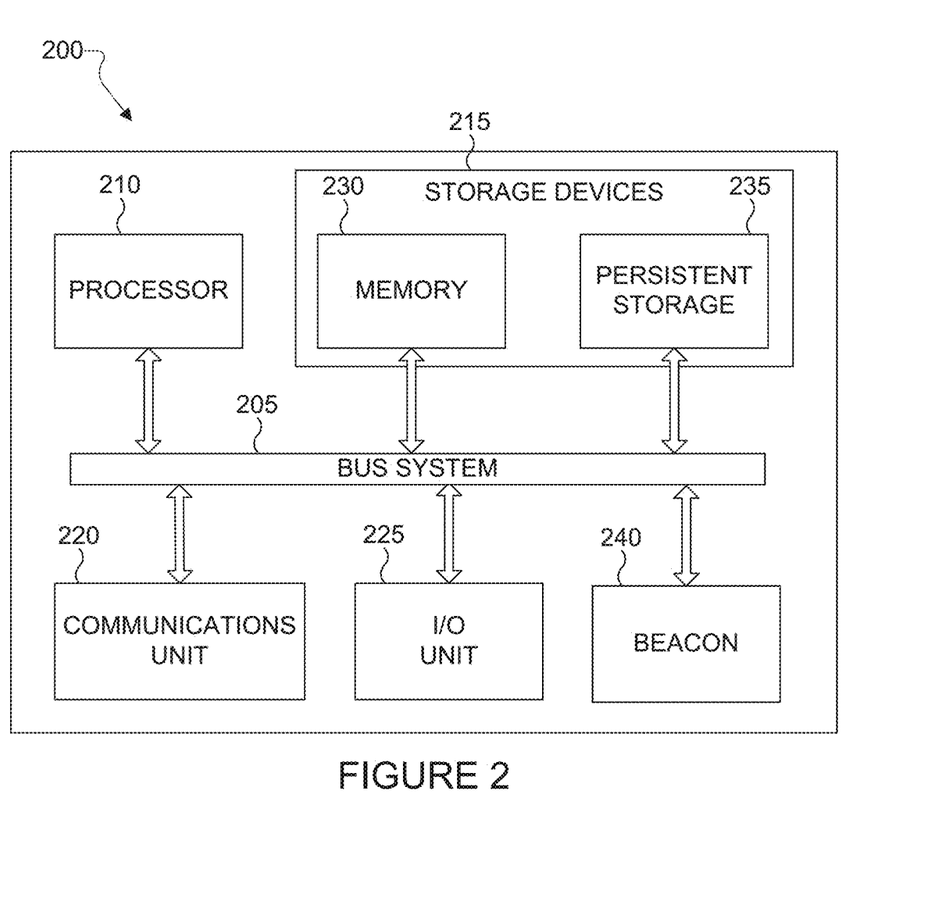
FIG. 2 illustrates an example device in a computing system according to this disclosure.
Figure 3:
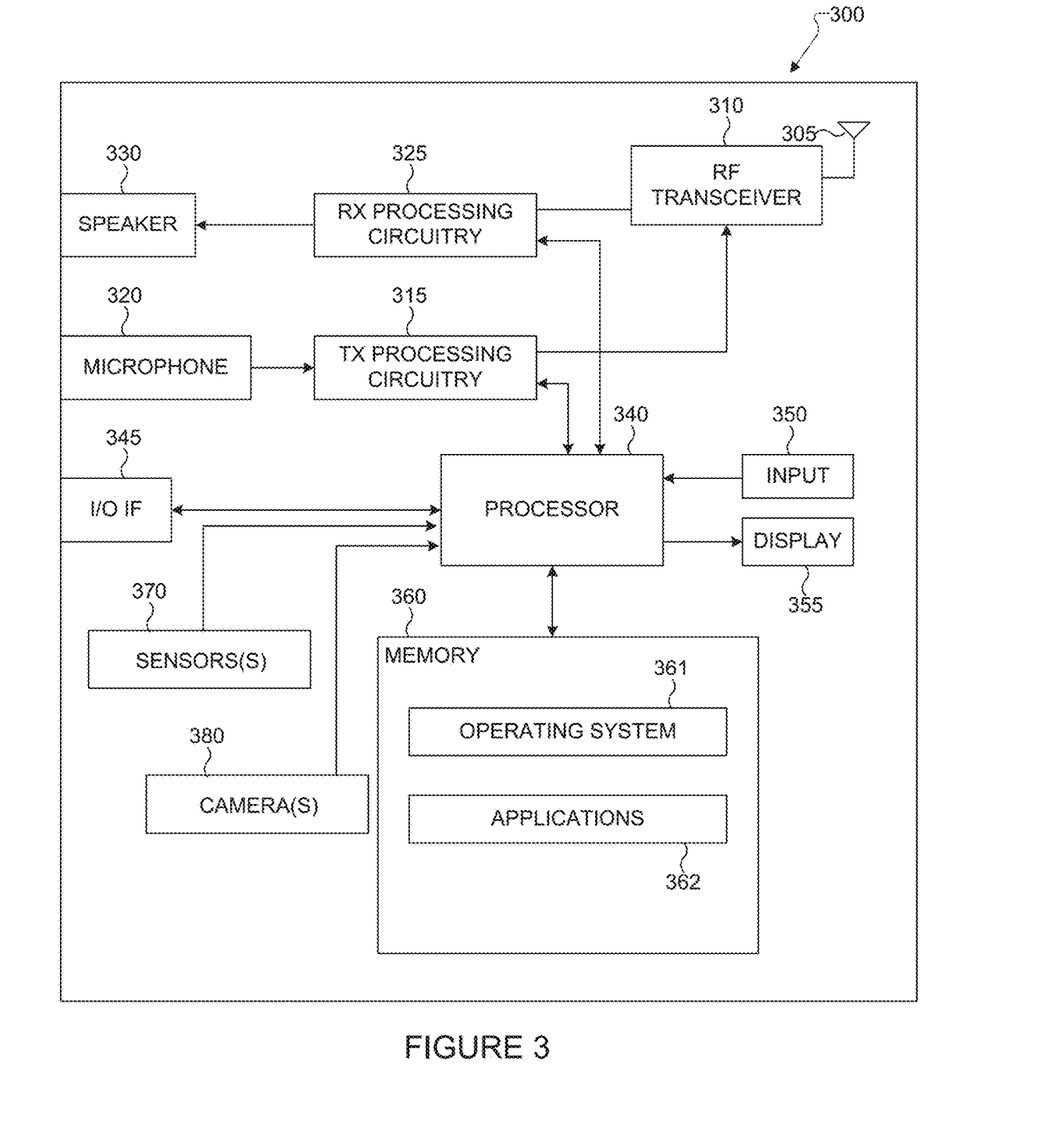
FIG. 3 illustrates an example electronic device according to this disclosure.

FIGS. 2 and 3 illustrate example devices in a computing system according to this disclosure. In particular, FIG. 2 illustrates an example IoT device 200, and FIG. 3 illustrates an example electronic device 300. The IoT device 200 could represent the one or more of the IoT devices 104-114 in FIG. 1, and the electronic device 300 could represent the electronic device 104 in FIG. 1.

As shown in FIG. 2, the IoT device 200 includes a bus system 205, which supports communication between at least one processor 210, at least one storage device 215, and at least one communications unit 220.

The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc. Memory 230 stores an application thereon that is used to control one or more functions of the IoT device 200.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

In some embodiments, the IoT device 200 may include an I/O unit 225 that allows for input and output of data. For example, the I/O unit 225 may provide a connection for user input through a keyboard, mouse, keypad, touchscreen, or other suitable input device. The I/O unit 225 may also send output to a display, printer, or other suitable output device.

A beacon 240 provides an indication to another device, such as UE 300, that the IoT device 200 is present. The beacon may include a radio frequency identification (RFID) device, an infrared beacon transmission device, a BLUETOOTH® Low Energy (BLE) beacon, or other short range communication method to signal an electronic device 300 that the IoT device 200 is within a predetermined range from the electronic device 300. In other embodiments, the beacon 240 may be part of the communications unit 220. For example, the communications unit 220 may send out a beacon signal to indicate that the IoT device 200 is present, e.g., using WIFI®, BLUETOOTH®, or any short range communication protocols.

As described in more detail below, the IoT device 200 may be controlled by the electronic device 300 to perform one or more functions. The IoT device 200 may transmit an application or other data associated with the IoT device 200 to the electronic device 300 during a first communication session. Thereafter, upon detecting the IoT device 200, the electronic device 300 may execute the previously transmitted application when a user desires to control the IoT device 200.

The IoT device 200 may be trackable in a three-dimensional (3D) space by the electronic device 300. The IoT device 200 may advertise its presence using the beacon 240. The IoT device 200 also provides the software associated with the IoT device 200 when discovered by the electronic device 300 and can transmit the IoT device's 200 virtual control panel and/or associated data format to the electronic device 300. The data may be transmitted via WIFI®, BLUETOOTH®, or any other short range communication method. In some embodiments, the IoT device 200 may transmit a uniform resource identifier (URI) to the electronic device 300 that may provide a source for downloading the virtual control panel and/or associated data. The IoT device 200 may act on data received from the electronic device 300 in a specified format (directly or indirectly).

Any user within proximity of the IoT device 200 may configured the IoT device 200. In some embodiments, only a registered electronic device 300 would be allowed to access the IoT device's 200 control functionality. The communication between the IoT device 200 and the electronic device 300 may be encrypted. The firmware of the IoT device 200 may be updated by the electronic device 300.

Although FIG. 2 illustrates one example of an IoT device 200, various changes may be made to FIG. 2. For example, the IoT device 200 could include any number of each component shown in FIG. 2.

FIG. 3 illustrates an example electronic device 300 according to this disclosure. The embodiment of the electronic device 300 illustrated in FIG. 3 is for illustration only, and the electronic device 104 of FIG. 1 could have the same or similar configuration. However, electronic devices come in a wide variety of configurations, and FIG. 3 does not limit the scope of this disclosure to any particular implementation of an electronic device. In one or more embodiments of this disclosure, the electronic device 300 may be replaced by a television or a HMD.

As shown in FIG. 3, the electronic device 300 includes a communication unit 310. The communication unit 310 may include, for example, a RF transceiver, a Bluetooth transceiver, or a WiFi transceiver. The mobile device 300 may also include transmit (TX) processing circuitry 315, a microphone 320, and receive (RX) processing circuitry 325. The UE 300 also includes a speaker 330, a processor 340, an input/output (I/O) interface (IF) 345, an input 350, a display 355, and a memory 360. The memory 360 includes an operating system (OS) program 361 and one or more applications 362.

The "communications unit 310" may receive an incoming RF signal such as, e.g., a Bluetooth signal or a WiFi signal. The "communications unit 310" may down convert the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the basic OS program 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 300 with the ability to connect to other devices such as laptop computers and handheld computers. The I/O interface 345 is the communication path between these accessories and the processor 340.

The processor 340 is also coupled to the input 350 and the display 355. The operator of the electronic device 300 can use the input 350 (e.g., keypad, touchscreen, button etc.) to enter data into the electronic device 300. The display 355 may be a liquid crystal display, a light-emitting diode (LED) display, an optical LED (OLED), an active matrix OLED (AMOLED), a transparent or opaque display such one or more lenses on a pair of augmented reality glasses where one or more images maybe projected onto or displayed using the lens, or other display capable of rendering text and/or at least limited graphics, such as from web sites. In one embodiment, the input 350 is a touchscreen. The touchscreen could include a touch panel, a (digital) pen sensor, a key, or an ultrasonic input device. The touchscreen could recognize, for example, a touch input in at least one scheme among a capacitive scheme, a pressure sensitive scheme, an infrared scheme, or an ultrasonic scheme. The touchscreen could also include a control circuit. In the capacitive scheme, the touchscreen could recognize touch or proximity.

The memory 360 is coupled to the processor 340. Part of the memory 360 could include a random access memory (RAM), and another part of the memory 360 could include a Flash memory or other read-only memory (ROM).

Electronic device 300 may further include one or more sensors 370 that can meter a physical quantity or detect an activation state of the electronic device 300 and convert metered or detected information into an electrical signal. For example, sensor 370 may include one or more buttons for touch input, e.g., on the headset or the electronic device 300, one or more cameras 380, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 370 can further include a control circuit for controlling at least one of the sensors included therein. As will be discussed in greater detail below, one or more of these sensor(s) 370 may be used to control a UI, detect UI inputs, determine the orientation and facing direction of the user for 3D content display identification, etc. Any of these sensor(s) 370 may be located within the electronic device 300, within a headset configured to hold the electronic device 300, or in both the headset and electronic device 300, for example, in embodiments where the electronic device 300 includes a headset.

Electronic device 300 may also include one or more cameras 380. Camera 380 may be a red, green, blue (RGB) camera or an infrared camera. As will be discussed below, camera 380 may be used to track one or more IoT devices, to track a user's eye to perform functions, or to track hand and/or finger gestures. In order to track a user's eye, the camera 380 may face internally relative to the electronic device 300 to capture a portion of the user's head. In order to track the one or more IoT devices or hand and/or finger gestures, the camera 380 may face externally relative to the electronic device 300.

The electronic device 300 locates and tracks the IoT device 200 in a 3D physical space using computer vision (CV) and/or the beacon 240 and the camera 380. The electronic device 300 creates a 3D model in an augmented reality (AR) space that represents the IoT device 200 so the 3D model can be attached to additional virtual content if desired. The electronic device 300 also tracks all user input associated with the IoT device virtual control panel (FIG. 4B), processing the inputs, and updating the view of the electronic device 300 in real time.

Although FIG. 3 illustrates one example of electronic device 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

Figure 4A:
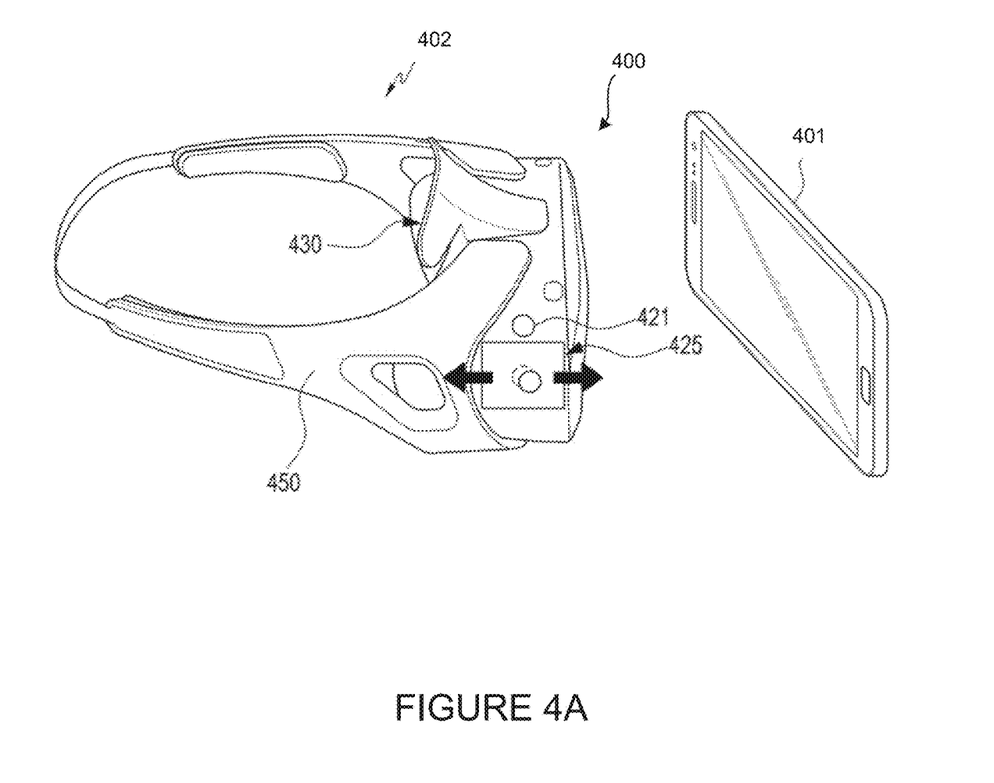
FIG. 4A illustrates a perspective view of a head mounted display (HMD) according to this disclosure.

FIG. 4A illustrates a perspective view illustrating an HMD 400 which may include an electronic device 401 and an electronic device 402 according to an embodiment of the present disclosure. HMD 400 illustrates one example of the electronic device 300 that may be used with the embodiments of the present disclosure. In other embodiments, electronic device 300 may be a pair of augmented reality glasses or an HMD with an integrated display and components.

The electronic device 401 may include a display. The electronic device 401 may store a virtual reality application. For example, the electronic device 401 may be the electronic device 300 and include all the features of the electronic device 300 such as sensors 370 and internally and externally facing cameras 380. The virtual reality application may be an application which can provide a display similar to an actual reality to the user. According to an embodiment, the virtual reality application may display a left eye image and a right eye image corresponding to each of the user's eyes based on a stereo scheme.

The electronic device 402 may be a head mounted theater (HMT) device. The HMT device may be mounted on a user's head and fixed to the user's head even though the user moves. Further, the HMT device may also fix the electronic device 401 and thus the user may view an image displayed on the electronic device 401.

The electronic device 402 according to an embodiment may include a housing 450 provided to be worn on the user's head, a blackout part 430 fixed to the housing and provided at an area corresponding to locations of the user's eyes, and at least one input button 421 provided at one area of the housing 450. The electronic device 402 may include an input pad 425 which may receive an input from the user such as a swipe, tap, or other input performed by a user.

The blackout part 430 provides a seal against external light from entering the space between a user's eyes and the electronic device 410. Thus, the user may position the user's eyes to fit closely to the blackout part 430 and, accordingly, the user may view the image by the virtual reality application provided from the electronic device 401 without any interference from external light.

The electronic device 401 may be coupled to the electronic device 402. The electronic device 401 may be connected to the electronic device 402 through a wire or wirelessly. For example, although the electronic device 401 may be connected to the electronic device 402 based on a USB connection. The aforementioned is merely an example and it may be easily understood by those skilled in the art that there is no limitation on the connection if data transmission/reception between the two devices 401 and 402 is possible through the connection. According to another embodiment, the electronic device 401 may be directly coupled to the electronic device 402 without the use of a wire or wireless connection.

Figure 4B:
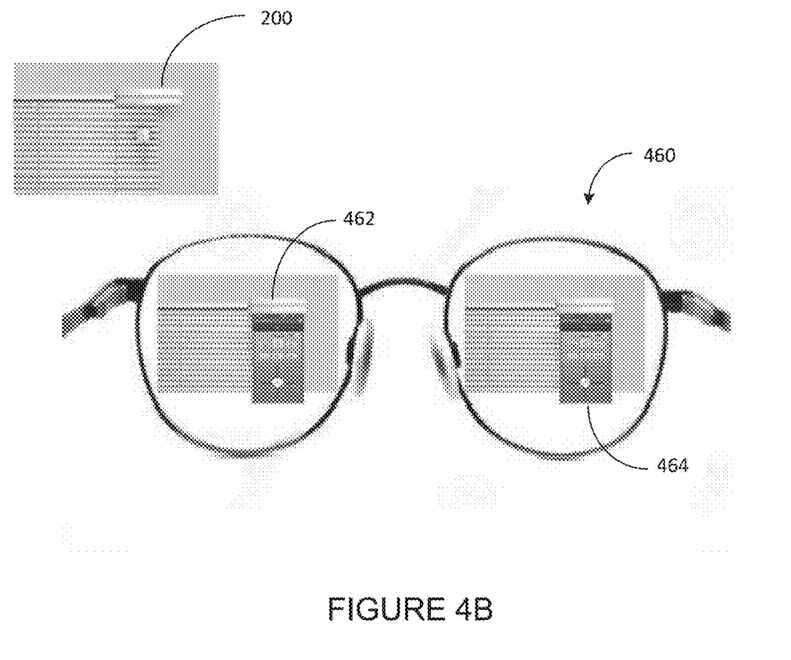
FIG. 4B illustrates an example view shown in the HMD according to this disclosure.

FIG. 4B illustrates an example view shown in the HMD according to this disclosure. As shown in FIG. 4B, an AR view 460 includes a 3D model 462 of the IoT device 200 and a virtual control panel 464. The virtual control panel 464 includes at least one control button used to control at least one function of the IoT device 200. A user may control the virtual control panel 464 via hand and/or finger gestures, eye tracking, or inputting a command using input pad 425. As an example, a user may tap on some part of the virtual control panel 464 or a virtual representation of the IoT device 200 itself with their finger. In some embodiments, the user may make a hand gesture that would cause a set of instructions to be transmitted to the IoT device 200.

The IoT device's virtual control panel 464 can be in 3D and does not have to be static. In other words, the content can be scrolled/animated onto the visible surfaces of the virtual control panel 464 or the IoT device 200 itself. The user may reach out and interact with the virtual control panel 464. The virtual control panel 464 may be customizable or reconfigurable depending on the respective IoT device 200. The virtual control panel 464 may manage multiple IoT devices at a time. For example, opening or closing all the windows in a given room at the same time or in a specific order.

The electronic device 300 may have an application that allows IoT devices to be used for different purpose. For example, one application may create a 3D visualization of the temperature of the room by receiving temperature data from each of a window shade IoT devices. The user could set preferences and the application would drive the window shade IoT devices to implement them. Another application may show the brightness of the room based on data from the window shade IoT devices and allow the user to set a preference and then use the windows shade IoT device adjust the brightness of the room.

In some embodiments, the electronic device 300 user will not always have the IoT device 200 in their field of view (FOV). The user may still wish to interact with the virtual control panel 464 while the IoT device 200 itself is not visible which may include receive notifications from the IoT device 200.

In some embodiments, the IoT device 200 does not have to be physical anchor point for the virtual control panel 464. For example, a user may select any physical or virtual object to act as the physical marker for the IoT device 200. For example, using an IoT shade control device as an example, the IoT shade control UI could be tied to a virtual reality 3D weather widget stored and executed on the electronic device 300. When the user selects the VR 3D weather icon, e.g., using eye tracking, the user gets the option to interact with the IoT shade control UI. In other embodiments, when the user looks at a specific physical wall light switch the user gets the option to interact with the IoT shade control UI.

Figure 4C:
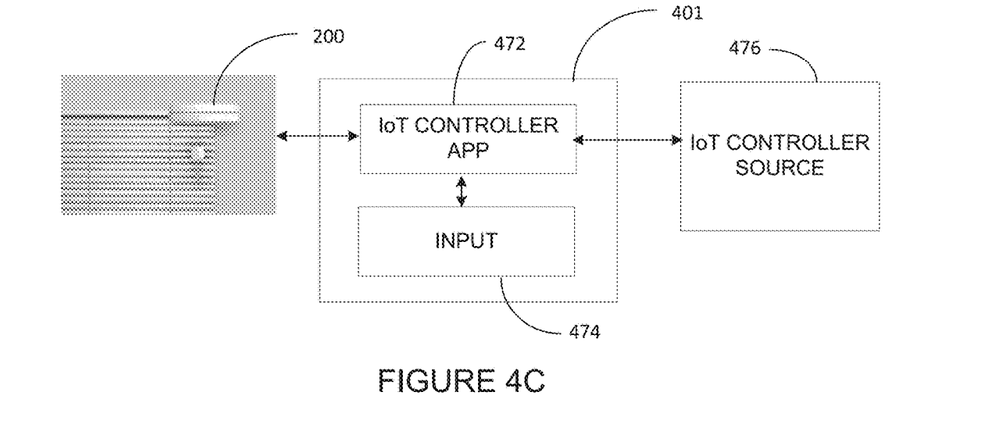
FIG. 4C illustrates an example system diagram according to this disclosure.

FIG. 4C illustrates an example system diagram according to this disclosure. As shown in FIG. 4C, an IoT controller application 472 on electronic device 401 communicates with the IoT device 200. The IoT controller application 472 may also communicate with an IoT controller source 476 on the Internet to receive the virtual control panel 464 and other information associated with the IoT device 200. An input 474 is provided to the IoT controller application 472 to control the IoT device 200. The input 472 may be a user input or an input from another application on the electronic device 401.

Figure 5:
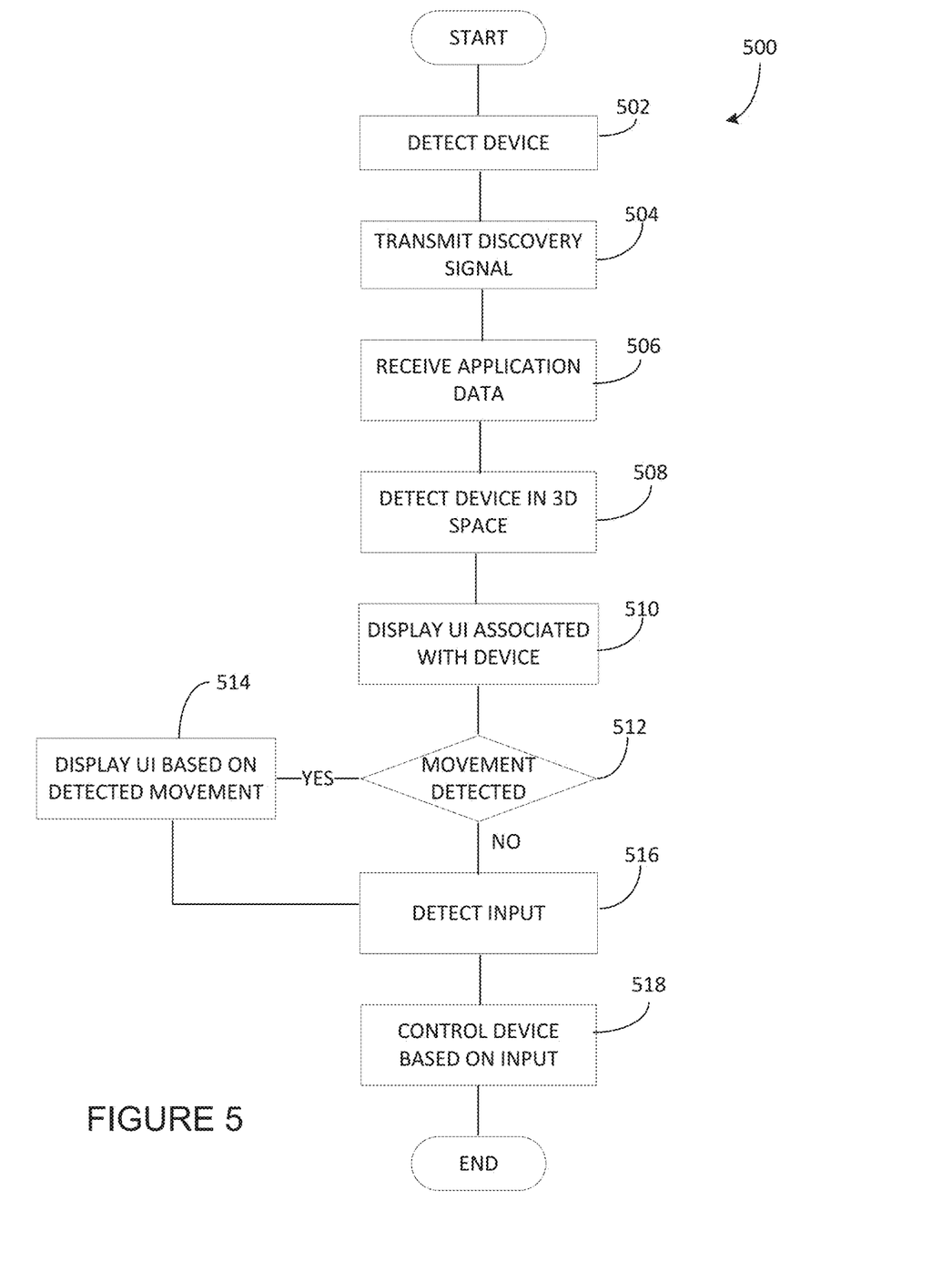
FIG. 5 illustrates a flowchart of a method for controlling an IoT device using an HMD according to this disclosure.

FIG. 5 illustrates a flowchart of an exemplary method 500 for controlling an IoT device using an HMD according to this disclosure. The method 500 will be discussed while making reference to the IoT device 200 of FIG. 2 and the electronic device 300 of FIG. 3.

As shown in FIG. 5, the method 500 begins in operation 502 where the electronic device 300 detects the IoT device 200 using the beacon 240. As discussed above, the beacon may be an RFID, or other short range communication, that emits a signal that may be detected by the electronic device. Upon detection of the signal, a secure channel can be established. Each IoT device 200 may have a unique identifier that would be transmitted to the IoT controller application 472 to distinguish the IoT device 200. The unique identifier may be physical marker such as a QR code or a specific infrared beacon transmission pulse pattern based on the unique identifier of the IoT device 200.

In other embodiments, the beacon may be an infrared beacon the may be detected by a camera 380. Once the IoT device 200 is detected, the electronic device 300 transmits a discovery signal in operation 504.

After receiving the discovery signal from the electronic device 300, the IoT device 200 transmits a signal including data to the electronic device 300 in operation 506. The data may include the virtual control panel 464, a link to a uniform resource identifier (URI) where the electronic device 300 may be able to download the virtual control panel 464, configuration data of the IoT device 200, information regarding additional IoT devices that may be controlled by the virtual control panel 464, and other information associated with the IoT device 200.

In operation 508, the electronic device 300 detects the IoT device 200 in the 3D space using at least one camera 380. Detection of the IoT device 200 in the 3D space may be performed using one or more of computer vision methods, the beacon 240, timing of signals transmitted between the electronic device 300 and the IoT device 200, distance sensors such as ultrasonic transducers, etc. For example, one method of tracking in 3D space may include communicating with the IoT device 200 to control one or more emitters (e.g. LED) on the IoT device 200. The electronic device 300 may include receivers (e.g. camera 380) for said emitters and eliminate false positives by varying the signal from the emitter on the IoT device 200 which may be controlled by the electronic device 300. The electronic device 300 detects the emitters via its receivers and thus locates the IoT device 200.

In operation 510, the electronic device 300 displays the virtual control panel 464 with a 3D model 462 of the IoT device 200 or in the vicinity of the IoT device 200 if the IoT device 200 is within the field of view. The electronic device 300 may display the virtual control panel 464 adjacent to the 3D model 462 of the IoT device 200 or the IoT device 200 itself so that a user may intuitively associate the virtual control panel 464 to the IoT device 200 as shown in FIG. 4B. In some embodiments, for example, when the IoT device 200 is not within the field of view of the electronic device 300, the electronic device 300 may display the virtual control panel 464 without displaying the 3D model 462 of the IoT device 200.

In operation 512, the electronic device 300 detects whether a user moves the electronic device 300. If the electronic device 300 detects movement, the electronic device 300 displays the virtual control panel 464 based on the user's movement in operation 514. For instance, if the electronic device 300 is part of an HMD 400, the user may turn or tilt the user's head causing the IoT device 200 to move within the field of view. The electronic device 300 may detect this movement using one of the sensors 370, such as an accelerometer, to determine the degree of movement. The processor 340 then correlates the degree of movement with a new display position for the 3D model 462 and/or virtual control panel 464. In some embodiments, the virtual control panel is not tied to a particular IoT device 200 within the field of view or the 3D model 462 of the device. Thus, when the electronic device 300 detects movement, the virtual control panel 464 stays in the same location on the display of the electronic device 300.

If no movement is detected, the method 500 proceeds to operation 516 where a user input is detected. The input may be performed based on a hand gesture, finger gesture, or eye movement which may be captured by camera 380. In some embodiments, the input maybe entered using the input pad 425. Based on the input, the electronic device 300 transmits a control signal to the IoT device 200 in operation 518 to control at least one function of the IoT device 200.

The embodiments described herein may simplify a user's experience with IoT devices. For example, after checking into a hotel, a user may walks to their hotel room wearing electronic device 300. The room door may unlock or open based on the virtual key previously stored in electronic device 300. The hotel room may include a number of smart IOT devices in the room (e.g., window shade, AC, light controller). The electronic device 300 broadcasts a segment of the virtual door key in hopes of finding IOT devices in the room. The smart IOT devices in the room notify the electronic device 300 of their presence. The smart IOT devices can be configured to only be discoverable based on a specific key being broadcast to them via BT or RFID/NFC. As the user settles in, when a smart IOT device is found within the electronic device 300 field of view (via CV), an overlay highlights the found smart IoT device. If the user selects that device the associated virtual control panel will be shown on the display of the electronic device 300. The user can then set their preferences, e.g., what A/C temp they want and during which time periods. In some embodiments, the electronic device 300 may trigger the window shade app to gradually open the physical window shades when the user sets a wake up alarm. These settings could be reused on other compatible smart IOT devices.

In another example, the IoT device 200 may be a refrigerator. When the user looks at the refrigerator, the electronic device 300 overlays a UI on the outside of the fridge door. The UI may show the contents of the fridge and provide an indication as to items that are running low or expiring. Such information may be stored and used with other apps like Amazon Fresh to help the user know what to order. The UI itself could be 3D in nature and mimic the content of the actual refrigerator. As the user moves it would appear they were looking at the semi-transparent UI content from different angles. This would permit a user to see what is inside without opening the refrigerator and a user can also check the refrigerator from the other side of the room or a different room.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A wearable head mountable device comprising:
a transceiver;
a display; and
a processor, coupled to the display and the transceiver, the processor configured to:
  detect an Internet of Things (IoT) device, from among a plurality of IoT devices, controllable by the wearable head mountable device;
  receive application data from the IoT device, including information regarding similar IoT devices,
  generate a user interface (UI) associated with the IoT device for display on the display based on the application data, wherein the UI is displayed adjacent to a real-world view of the IoT device;
  detect an UI input to the UI associated with the IoT device; and
  transmit a signal to the IoT device to control the IoT device based on the detected UI input and transmit signals to the similar IoT devices to control the similar IoT devices based on the detected UI input.

2. The wearable head mountable device of claim 1, wherein the wearable head mountable device comprises a first electronic device and a head mounted theater device.

3. The wearable head mountable device of claim 1, wherein the processor is configured to generate an augmented reality view comprising the real-world view of the IoT device and the UI associated with the IoT device.

4. The wearable head mountable device of claim 3, wherein the transceiver is configured to transmit a discovery signal to the IoT device when the wearable head mountable device detects the IoT device.

5. The wearable head mountable device of claim 3, wherein the transceiver receives information from the IoT device to generate the UI, the information includes at least one of a virtual control panel having at least one control button for the IoT device, a uniform resource identifier, or configuration data associated with the IoT device.

6. The wearable head mountable device of claim 1, further comprising a sensor configured to detect the UI input.

7. The wearable head mountable device of claim 6, wherein the sensor comprises an externally facing camera configured to detect a gesture of a user as the UI input.

8. The wearable head mountable device of claim 6, wherein the sensor comprises an internally facing camera configured to detect movement of an eye of a user as the UI input.

9. The wearable head mountable device of claim 6, wherein the wearable head mountable device is at least part of a head mounted display (HMD) and the sensor is configured to detect a physical movement of the HMD when a user is wearing the HMD.

10. The wearable head mountable device of claim 9, wherein the processor is configured to display the UI with a three dimensional model of the IoT device or with the IoT device.

11. The wearable head mountable device of claim 9, wherein the processor is configured to modify display of the UI in response to the detected physical movement of the HMD.

12. An Internet of Things (IoT) device comprising:
   a memory configured to store an application for controlling the IoT device;
   a transceiver; and
   a processor operatively coupled to the memory and the transceiver, the processor is configured to:
      receive a first signal, via the transceiver, from a wearable head mountable electronic device after the wearable head mountable electronic device detects the IoT device the first signal including a specific key transmitted via a near-field communication medium;
      transmit information about the application, including information regarding similar IoT devices, to the wearable head mountable electronic device, via the transceiver, in response to receipt of the first signal; and
      receive a second signal, via the transceiver, from the wearable head mountable electronic device based on the information about the application; and
      control at least one function of the IoT device based on the second signal from the wearable head mountable electronic device.

13. The IoT device of claim 12, wherein the transceiver is configured to receive an application update from the wearable head mountable electronic device.

14. The IoT device of claim 12, further comprising a beacon, the beacon is configured to permit detection of the IoT device by the wearable head mountable electronic device.

15. The IoT device of claim 14, wherein the beacon is an infrared beacon or a radio frequency identification (RFID) device.

16. A method for operating a wearable head mountable device to control an Internet of Things (IoT) device, from among a plurality of IoT devices, the method comprising:
   detecting the IoT device controllable by the wearable head mountable device;
   receiving application data from the IoT device, including information regarding similar IoT devices,
   generating a user interface (UI) associated with the IoT device for display on the wearable head mountable device based on the application data, wherein the UI is displayed adjacent to a real-world view of the IoT device;
   detecting an UI input to the UI associated with the IoT device; and
   transmitting a signal to the IoT device to control the IoT device based on the detected UI input and transmitting signals to the similar IoT devices to control the similar IoT devices based on the detected UI input.

17. The method of claim 16, wherein the UI input is a hand gesture, finger movement, or eye movement.

18. The method of claim 16, wherein detecting the IoT device includes detecting a beacon of the IoT device.

19. The method of claim 16, further comprising transmitting a discovery signal to the IoT device when the IoT device is detected.

20. The method of claim 16, further comprising:
   detecting movement of the wearable head mountable device; and
   displaying the UI based on the movement of the wearable head mountable device.

* * * * *